April 25, 1933.  C. A. RICH  1,906,099
NUT MAKING MACHINE
Filed Oct. 20, 1931  4 Sheets-Sheet 2
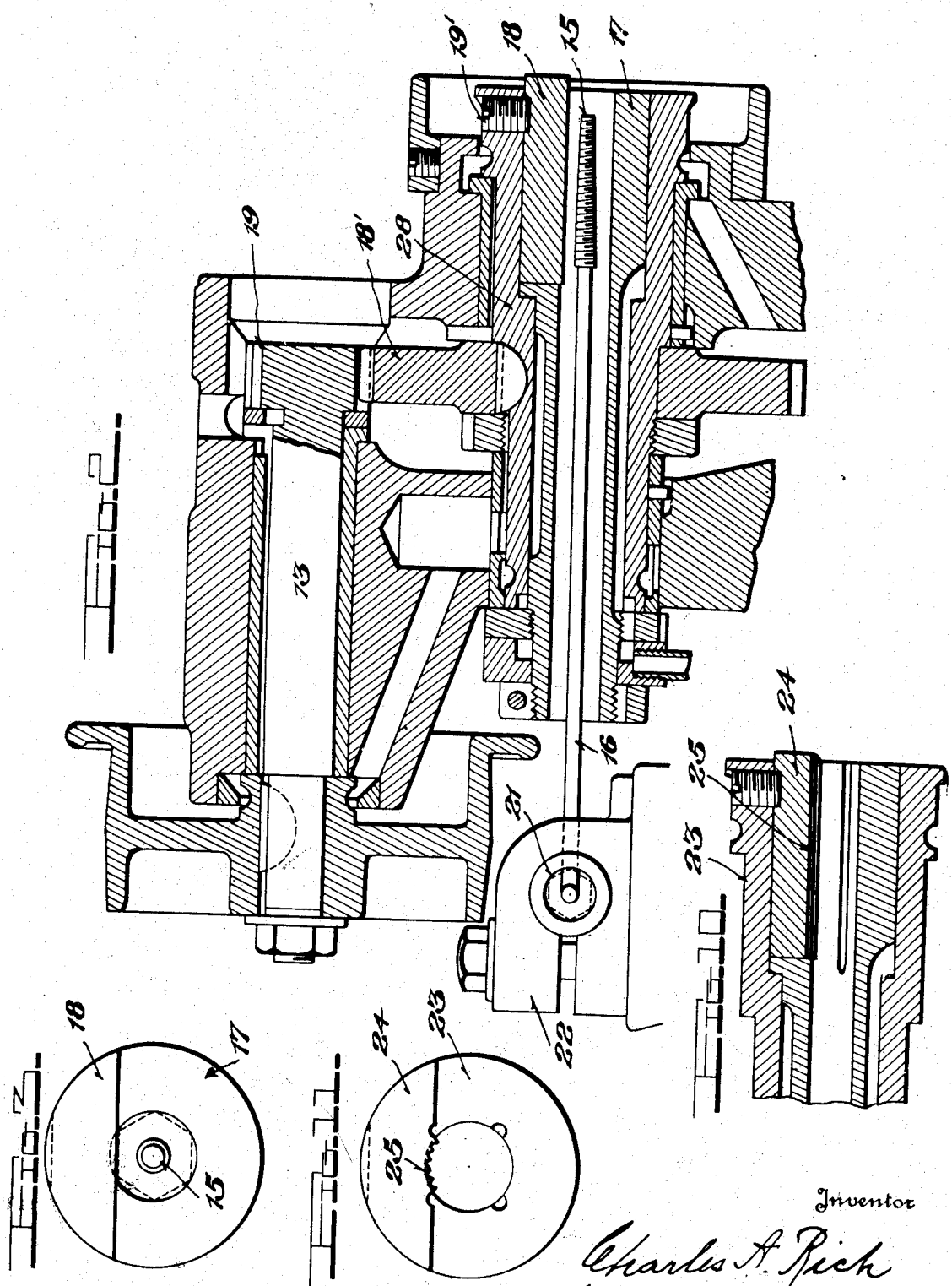
Inventor
Charles A. Rich
By Joseph A. Miller
Attorney

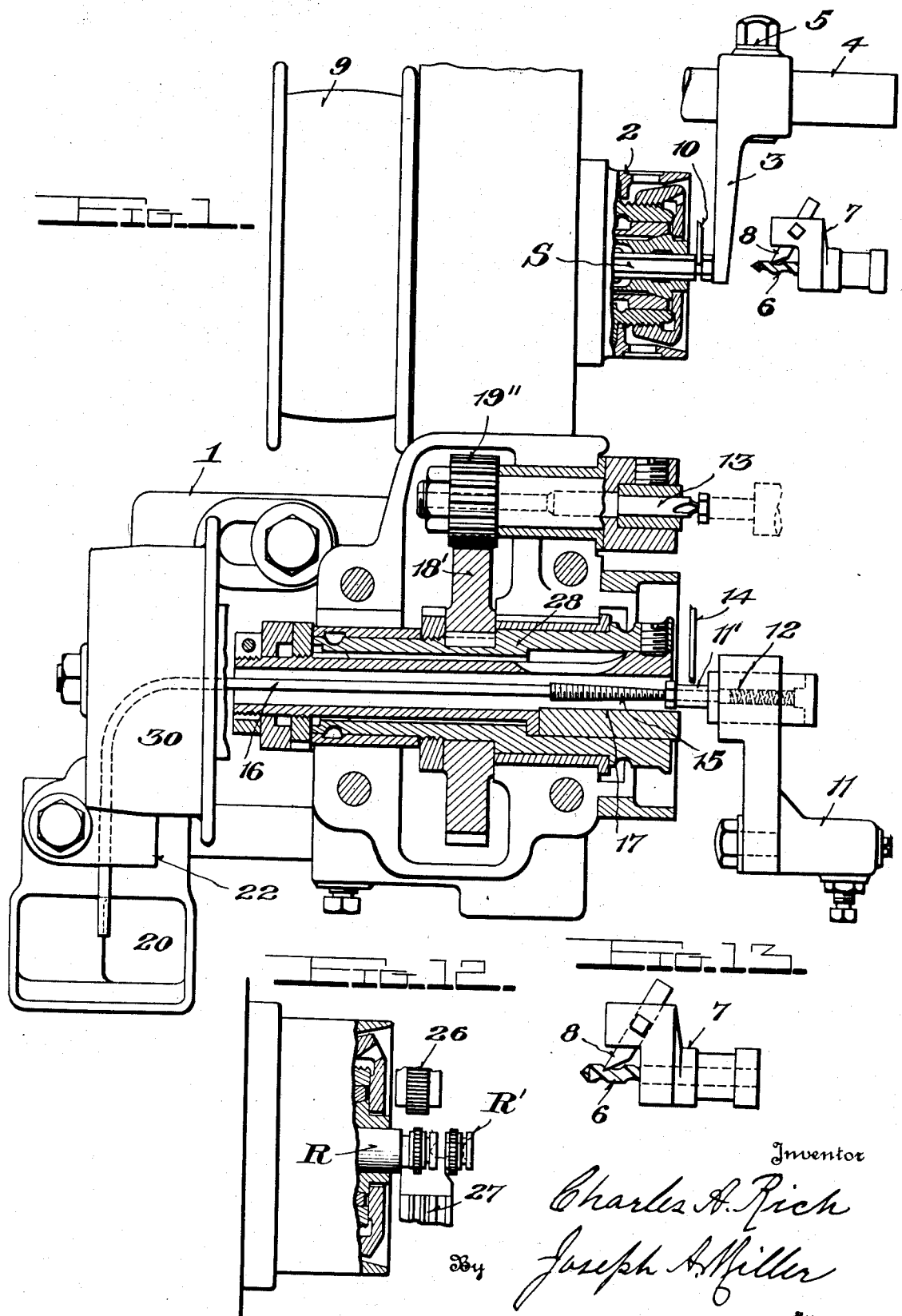

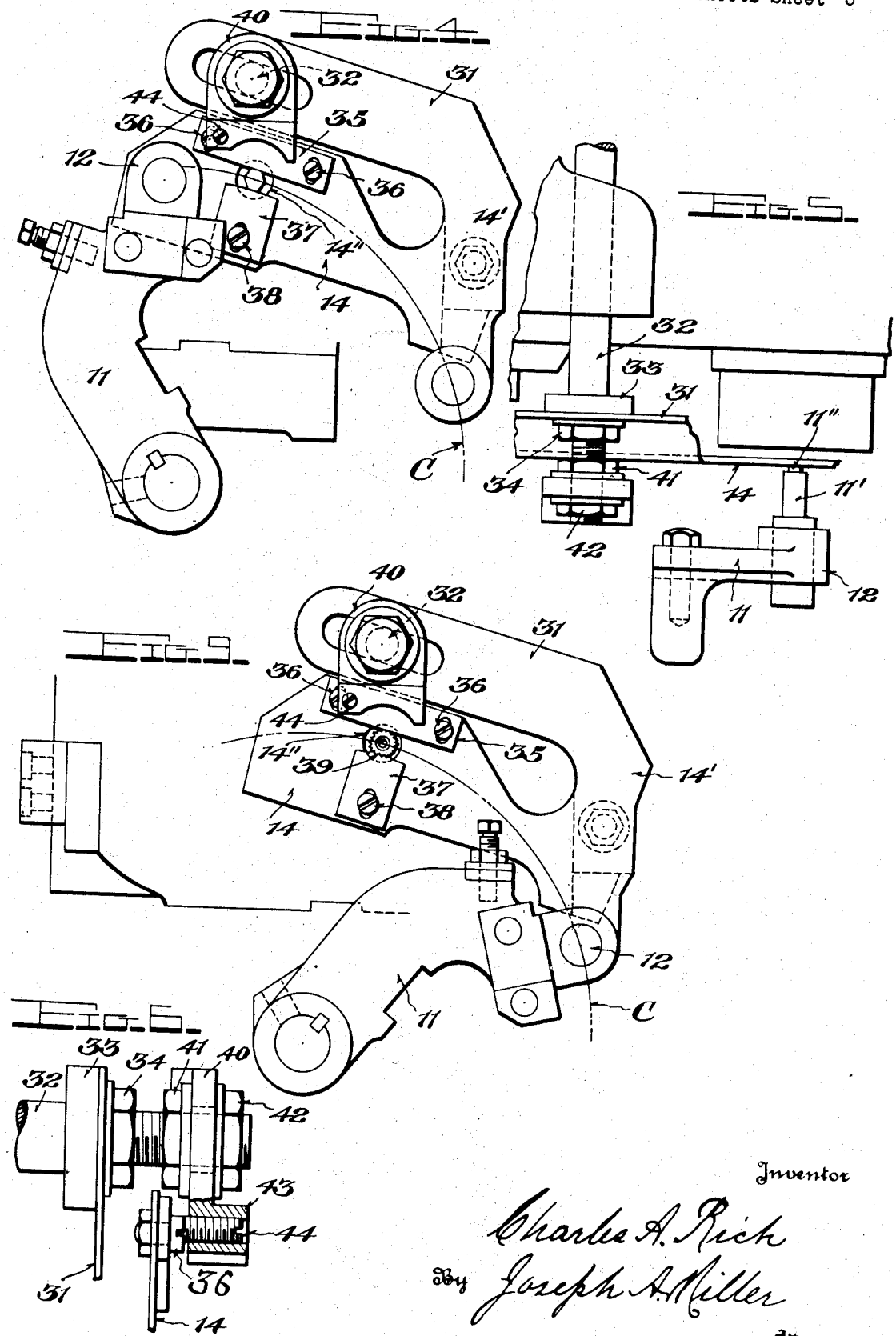

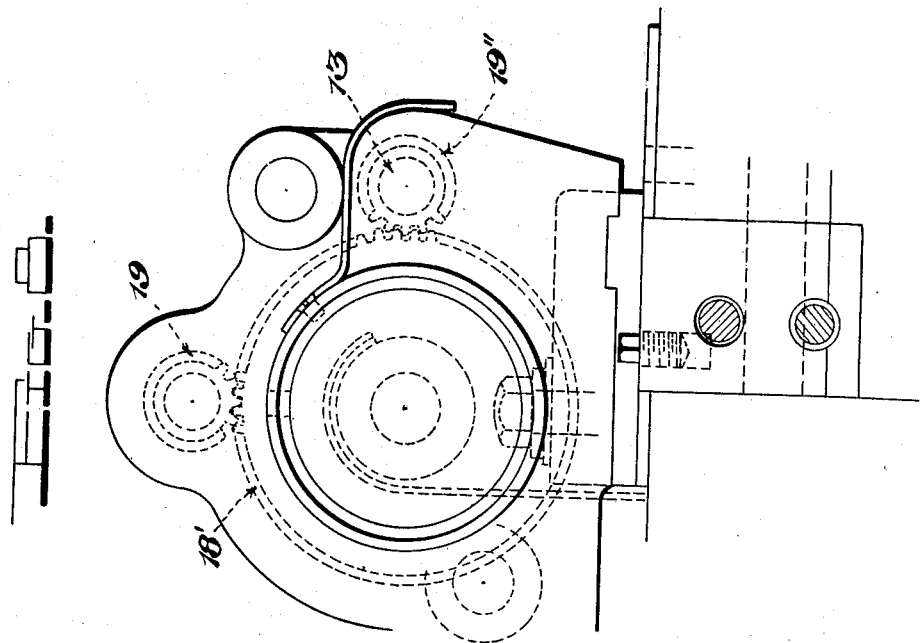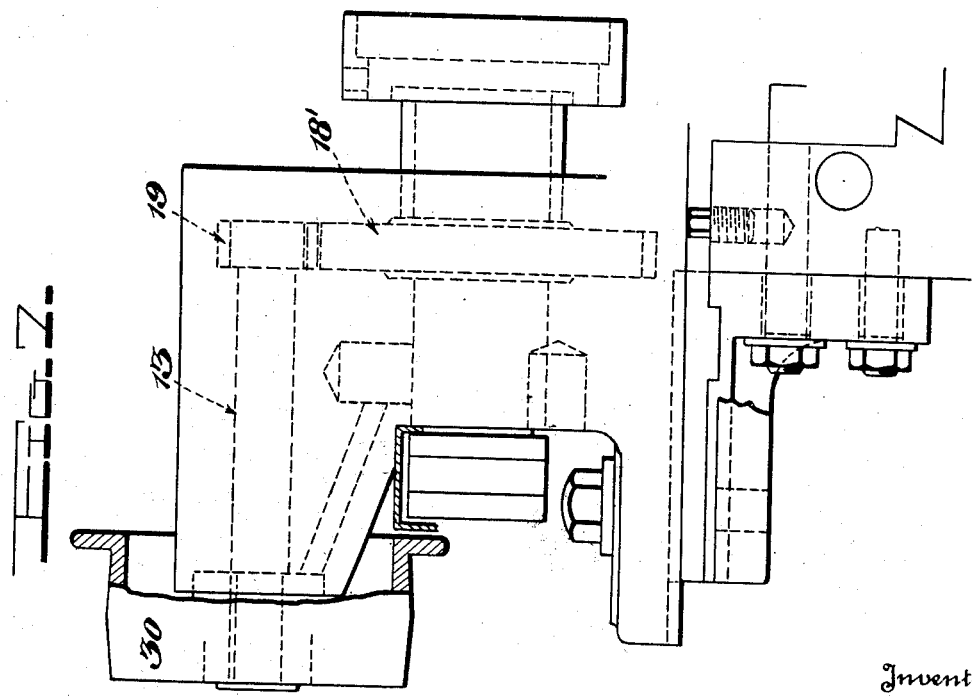

Patented Apr. 25, 1933

1,906,099

UNITED STATES PATENT OFFICE

CHARLES A. RICH, OF PROVIDENCE, RHODE ISLAND, ASSIGNOR TO BROWN & SHARPE MFG. CO., OF PROVIDENCE, RHODE ISLAND

NUT MAKING MACHINE

Application filed October 20, 1931. Serial No. 569,924.

This invention relates to nut making machines and more particularly relates to a machine wherein the stock is drilled and counter-sunk, then cut into length and finally threaded, and discharged from the machine.

The primary object of the invention is to provide an attachment which can be applied to a machine of standard type employed for nut making, or which may be incorporated in a specially designed machine, and to further provide improved means for transferring the severed blank after drilling, to the counter-sinking mechanism and from the latter to the threading or tapping mechanism and still further and more specifically aims to provide a flexible means which positively retains the blank on the transfer arm or mechanism during transfer movement thereof, and to provide means for preventing excess vibration of the flexible means.

Further, the invention aims to provide improved means for use with either hexagonal, or circular knurled nuts to hold same against rotation.

The invention has still further and other objects which will be more particularly set forth and manifested in the course of the following description.

In the drawings:—

Figure 1 is a top plan view partly broken away and in section showing a part of the transfer mechanism for transferring the blank;

Figure 2 is an enlarged fragmentary section partly broken away showing the tapping mechanism;

Figure 3 is a front end elevation of the chuck employed in the tapping mechanism;

Figure 4 is an end elevation of the transfer arm for use with hexagonal nuts;

Figure 5 is a top plan view of Figure 4;

Figure 6 is a detail view partly in section of the means for limiting vibration of the flexible member of the transfer mechanism;

Figure 7 is a side elevation partly broken away and in section of the drive for the tapping spindle;

Figure 8 is a front end elevation of Figure 7;

Figure 9 is a view similar to Figure 4 of a form of transfer mechanism for use in connection with circular knurled nuts;

Figure 10 is a fragmentary sectional view of the chuck used in the tapping of circular knurled nuts;

Figure 11 is an end view of the chuck of Figure 10;

Figure 12 is an elevation partly in section of the knurling mechanism and cut-off tool for round knurled nuts, Figure 13 is a detail view of the boring and counter-boring device.

In proceeding in accordance with the present invention and referring to Figure 1 it will be seen that a head 1 is provided which has a chuck 2 connected thereto, the latter receiving the stock S therein.

The stock, which is in the form of a bar, may be round, hexagonal or any other desired form dependent upon whether hexagonal nuts or round nuts, such as battery nuts are to be made. An oscillating stop 3 is mounted in front of the chuck and is adjustable along the length of its supporting shaft 4 and is held by a screw 5 so that the distance between the front end of the chuck and the stop 3 can be varied according to the length of the nuts to be made. The stock S is advanced through the chuck into engagement with the stop 3 and at the conclusion of the feeding of the stock the chuck 2 is closed to grip the work and at this time the stop 3 is swung out of the way so as to not interfere with the drill 6 carried by its holder 7, the drill having a counterboring tool 8 associated therewith as clearly shown in Figure 13. The chuck 2 is driven by a spindle on which a pulley 9 is mounted, the latter being driven from a suitable belt not shown. The drill 6 is advanced during the rotation of the stock held by and in the chuck 2, and at the same time the stock is countersunk or provided with a counterbore by means of the tool 8. After the drilling, the drill device is moved away from the stock and a cut-off tool 10 which is mounted on the rear cross slide then advances to sever the drilled portion of the stock therefrom and during cutting off, the transfer arm 11 which has a work or blank holder 12, then swings into position to pick up the nut as the cutting off operation is completed. The arm 11 then transfers the blank to the countersinking position to be operated upon by the spindle 13 for the purpose of countersinking the rear face or end of the nut. During the transfer of the work from the chuck 2 to the counter sinking mechanism 13, a flexible arm 14 shown in fragment in Figure 1, serves to hold the nut blank on the transfer arm, the present invention principally residing in this feature as will now be described.

As the work is completed by the counter sinking spindle 13, the transfer arm withdraws the nut and carries same to the threading or tapping mechanism.

As shown in Figures 1 and 2 of the drawings a floating tap is provided which has a tapping end 15 and a substantially L-shaped shank 16. The tap floats within a chuck 17 which is driven by a gear 18' connected thereto, the gear in turn being driven by a pinion 19 which latter drives the counter-sinking spindle 13 through a pinion 19''. The gear 18' is mounted on a shaft 28 which latter is driven by a pulley 30 as shown more particularly in Figure 1. The chuck in the instance of hexagonal nuts is equipped with an adjustable jaw or shoe 18 which is clamped by a screw 19' as shown in Figures 2 and 3, the jaw 18 engaging one of the faces of the hexagonal blank so as to hold same in the chuck and against rotation relative thereto. The tap 15 is on one end of the shank 16 while the opposite end 20 of the shank extends through a guide 21 which is mounted in a clamp block 22.

In the instance of round knurled nuts the chuck 23 shown in Figures 10 and 11 is employed and which has a jaw or shoe 24 adjusted by a screw 25 and provided with a corrugated curve face 25 to engage the blanks and hold same against rotation relative to the chuck during tapping.

In the instance of the formation of round knurled nuts and referring to Figure 12, a knurling tool 26 is carried by the back cross slide and knurls the round stock R. A cutting and forming tool 27 acts to shape the stock as shown in Figure 12, the blank R' being severed from the stock and carried to the counter sinking and tapping mechanisms as described in connection with hexagonal stock.

Referring now to Figures 4, 5, 6, and 9 it will be seen that the flexible arm 14, which forms the essential feature of the invention, is carried by or forms part of a U-shaped member 14', the other arm 31 of which is supported by means of a rod or bolt 32, that has a stop or nut 33 thereon and a nut 34 for clamping the arm 31 onto the rod. The flexible arm 14 has a jaw 35 adjustably mounted thereon by means of screws 36 and engages one side of the work, the opposite side of which is engaged by a second jaw 37 adjustably mounted by means of a screw 38. As shown in Figure 9 in the instance of knurled work, the jaw 37 has a corrugated face 39 corresponding to that of the knurling so as to hold the work against rotation, between the jaws 35 and 37. The arm 14 has an opening 14'' which is in register with the space between the jaws 35 and 37. An arm 40 is also mounted on the rod 32 between nuts 41 and 42 and has a threaded bore in which an adjusting screw 44 is mounted. The screw 44, as shown in Figure 6, is engageable with a screw 36 carried by the flexible plate 14, the screw 44 acting to restrict vibration of the flexible arm 14.

An adjustable screw 44 is carried by the arm 40 of the U-member to engage the screw 36 whereby the vibration of the arm 14 is restricted by the predetermined spacing of the screws 44 and 36 as is obvious. As shown in Figure 5 the arm 14 is offset from the arm 31 of the U-member.

Referring to Figures 1 and 5 it will be seen that the transfer arm has a work engaging spindle 11' formed with a projection 11'' to enter the bore of the blank, so that the flexible arm 14 holds the work on the pin 11' during the arc-like movement of the transfer arm as shown by the curved dotted lines C in Figures 4 and 9.

When the work reaches a position to be operated upon by either the spindle 13 or the tap 15 the transfer arm with its pin 11' moves inwardly and thereby causes the blank to move into engagement with either the spindle 13 or the tap 15, and due to the flexibility of the arm 14 the blank is accurately delivered to the tool and at the same time by virtue of the stops 44 and 36 excess vibration of the arm is prevented.

Having thus described my invention what I claim as new and desire to secure by Letters Patent is:

1. In combination with a work transfer arm, a substantially U-shaped member one arm of which is flexible and provided with a work receiving opening, jaws carried by the flexible arm in register with the opening, and means to support the U-shaped member with its flexible arm in the path of movement of the transfer arm, said flexible arm having a face to wipingly engage an end face of the work whereby to hold the work on the transfer arm.

2. In combination with a work transfer arm having means to hold the work against lateral movement and having an abutment, a relatively thin transversely flexible member having a face for wiping engagement with an end face of the work to hold the opposite end of the work against the abutment of the transfer arm during work transferring movement of the arm, and means to mount the member in the path of movement of the arm and for flexing movement.

3. In combination with a work transfer arm having means to hold the work against lateral movement and having an abutment, a relatively thin transversely flexible member having one of its faces disposed for wiping engagement with an end face of the work to hold the opposite end of the work against the abutment of the transfer arm during work transferring movement of the arm, means to mount the member in the path of movement of the arm and for flexing movement, and means carried by the mounting means and engaging the opposite face of the flexible member to limit flexing movement of the latter.

4. In combination with a work transfer means having means to hold the work against lateral movement and having an abutment, yielding means having a face for wiping engagement with an end face of the work to hold the opposite end of the work against the abutment of the transfer means during transferring movement of the latter, and means to mount the yielding means in the path of travel of the transfer means.

5. In combination with a work transfer arm, a substantially U-shaped member, one arm of which is flexible and provided with a work receiving opening, a depending part carried by the other arm of said member, jaws carried by the flexible arm in register with the opening, means to support the U-shaped member with its flexible arm in the path of movement of the transfer arm, said flexible arm having a face to wipingly engage an end face of the work whereby to hold the latter on the transfer arm, and means carried by the flexible arm and engageable with the depending part of the other arm of the U-shaped member to limit flexing movement of the flexible arm.

6. In combination with a work transfer arm having means to hold the work against lateral movement and having an abutment, a relatively thin transversely flexible member having a face for wiping engagement with an end face of the work to hold the opposite end of the work against the abutment of the transfer arm during work transferring movement of the arm, means to mount the member in the path of movement of the arm and for flexing movement, and means carried by the mounting means whereby to limit transverse movement of the flexible member.

7. In combination with a work transfer arm, a substantially U-shaped member having its arms disposed in spaced parallel vertical planes, one arm of said member being flexible and provided with a work receiving opening, jaws carried by the flexible arm in register with the opening, a depending part carried by the other of said jaws, means to support the U-shaped member with its flexible arm in the path of movement of the transfer arm, said flexible arm having a face to wipingly engage an end face of the work whereby to hold the work on the transfer arm, and means carried by the flexible arm and engageable with the depending part of the other arm for limiting flexing movement of said flexible arm.

In testimony whereof I have signed my name to this specification.

CHARLES A. RICH.